Nov. 5, 1929.    D. E. GAMBLE    1,734,767
CLUTCH
Filed Nov. 3, 1924    2 Sheets-Sheet 1
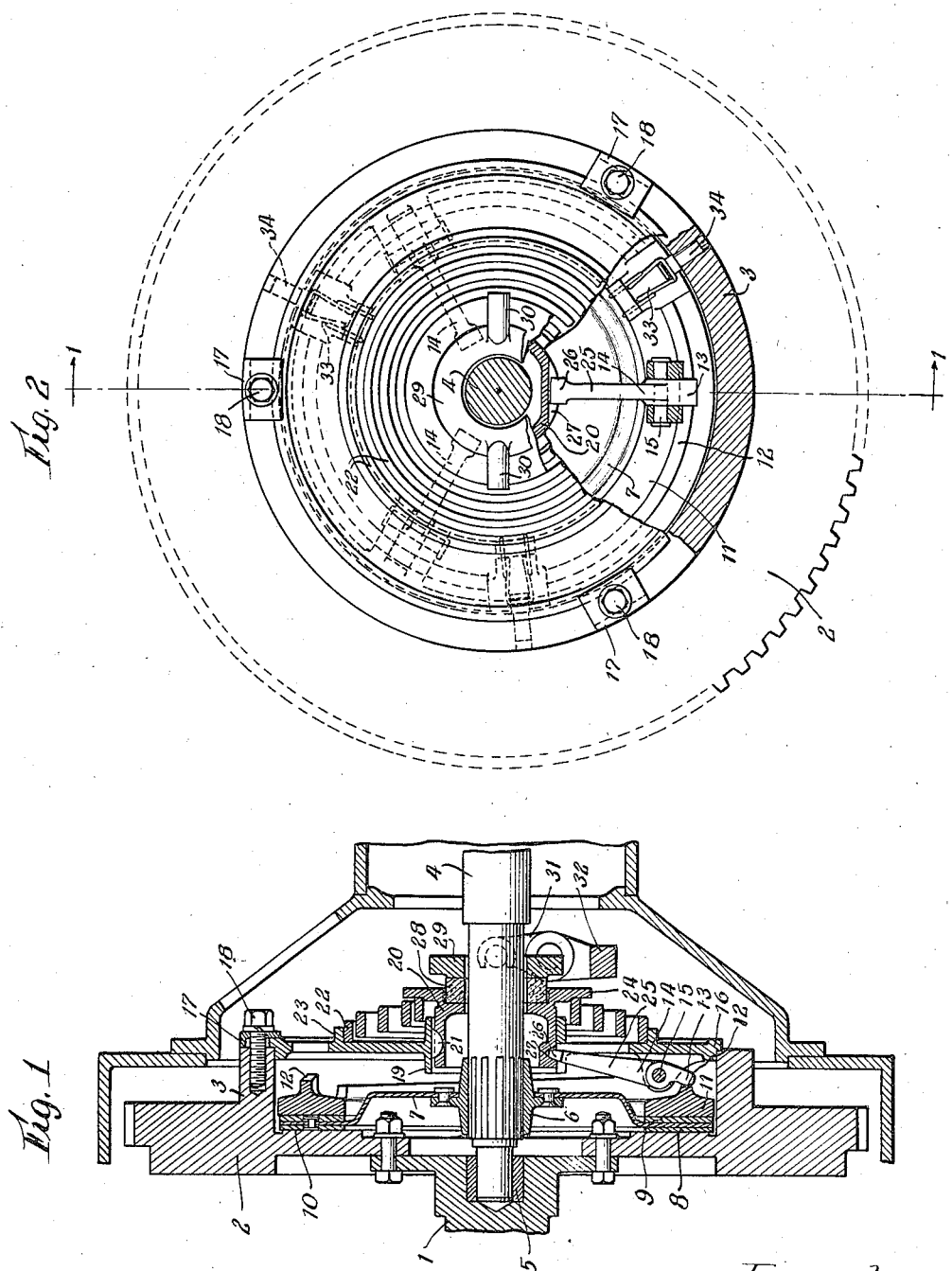
Inventor:
David E. Gamble
By: Wm O Bell
Atty.

Nov. 5, 1929.  D. E. GAMBLE  1,734,767
CLUTCH
Filed Nov. 3, 1924   2 Sheets-Sheet 2
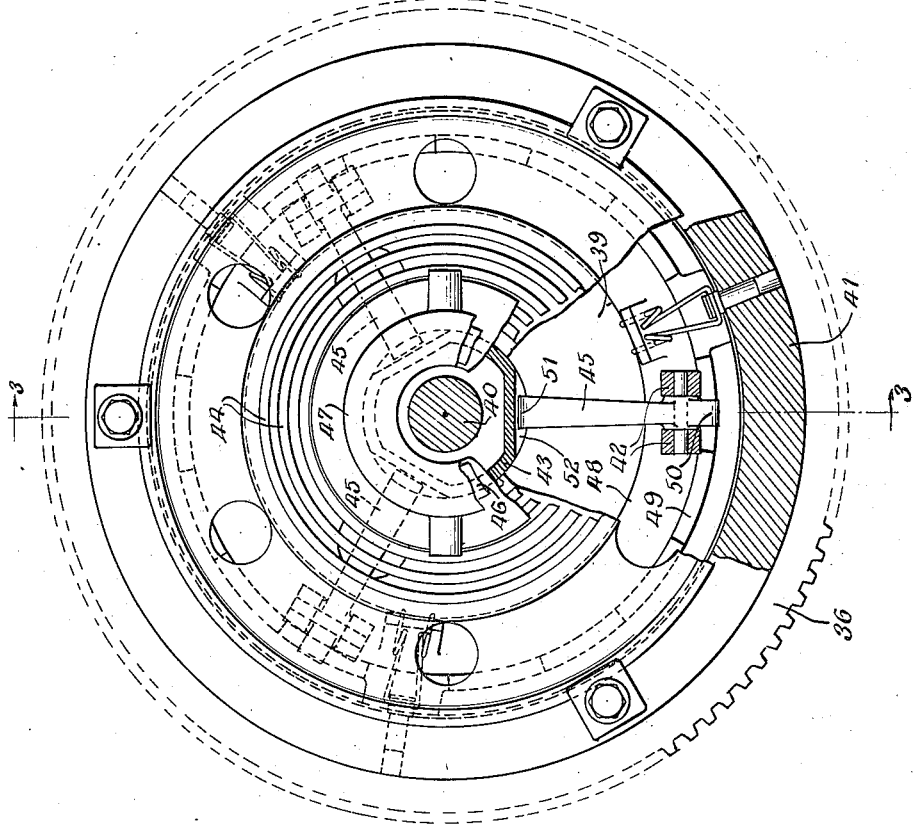
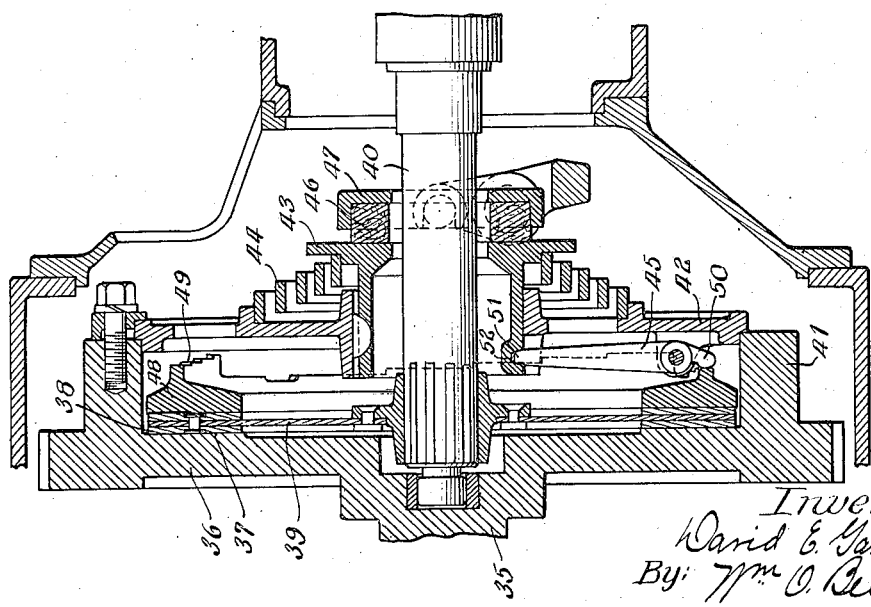

Patented Nov. 5, 1929

1,734,767

UNITED STATES PATENT OFFICE

DAVID E. GAMBLE, OF DETROIT, MICHIGAN, ASSIGNOR TO THE BORG & BECK COMPANY, OF CHICAGO, ILLINOIS, A CORPORATION OF ILLINOIS

CLUTCH

Application filed November 3, 1924. Serial No. 747,460.

This invention relates to a novel and improved clutch which, although particularly adapted for use with motor-driven vehicles, nevertheless finds utility in any other mechanism where it is desired to drive one shaft from another.

One of the principal objects of my invention is to provide a clutch in which substantially all of the parts of the clutch shall be free from engagement with the driven shaft, thus avoiding the necessity of lubrication of these parts.

A still further object is to provide a clutch having a composition bearing the wear of which will automatically tend to compensate for the wear on the frictionally engaged elements, thus avoiding the necessity of continuous adjustment to take up this wear.

A still further object is to provide a clutch having improved means for controlling the frictionally engaged elements, which shall be more efficient in operation and more compact in form, thus making possible a more compact clutch.

In the accompanying drawings in which I have shown selected embodiments of my invention Fig. 1 is a longitudinal sectional view through one form of my improved clutch taken on the line 1—1 of Fig. 2;

Fig. 2 is an end elevation of the clutch shown in Fig. 1 viewed from the right end with parts broken away;

Fig. 3 is a view corresponding to Fig. 1 showing a modified form of my invention and taken on the line 3—3 of Fig. 4 and Fig. 4 is a view corresponding to Fig. 2 of the modification shown in Fig. 3, parts thereof being broken away.

Referring now to the drawings and particularly to Figs. 1 and 2 the numeral 1 designates a driving shaft equipped with a fly-wheel 2 having an annular flange 3. Coaxial with the driving shaft 1 is a driven shaft 4, having one end supported in a bearing 5 in the end of the driving shaft.

Splined on the driven shaft 4 is a collar 6 carrying a friction disk 7 which in turn carries a pair of friction rings 8 and 9. The ring 8 is adapted to engage the face 10 of the fly-wheel 2 and is urged thereagainst by a cam ring 11 engaging the ring 9. This cam ring has cam faces 12 with which engage the short ends 13 of a plurality of levers 14, which are pivoted as at 15 upon lugs on a cover plate 16. The plate 16 is secured to the fly-wheel by any suitable means, in this instance clips 17 engaging the edge of the plate 16 and held in position by means of bolts 18 passing through the clips, and into the flange 3. It will be noted that the levers are arranged substantially midway between the clips on either side thereof.

The cover plate 16 is provided adjacent its central portion with a circular opening surrounded by a flange 19, preferably integral with the cover plate. This flange 19 supports a slidable clutch release sleeve 20 provided with a key 21 sliding in a groove in the flange 19. Movement of the sleeve 20 is controlled by a coiled spring 22 supported on the cover plate by suitable means as a circular flange 23 and engaging a flange 24 upon the sleeve 20. By this means the sleeve is forced to the right (Fig. 1). The longer arms 25 of the levers 14 are each provided at their ends with an involute gear tooth 26 engaging with a complementary recess 27 in the sleeve 20.

The sleeve 20 is recessed at its right hand face (Fig. 1) to receive a bearing 28 and to support the same clear of the driven shaft 4. This bearing 28 is held in place by a clutch release collar 29 provided with a plurality of trunnions 30 adapted to be engaged and supported by the fork 31 of the clutch lever 32.

In operation the compression spring 22 acts on the levers 14 through the sleeve 20 and forces the cam ring 11 against the friction ring 9 and thus urges the friction ring 8 against the face 10 of the fly-wheel. By this means the friction disk 7 is caused to rotate with the fly-wheel and consequently with the driving shaft, and, being splined upon the driven shaft, said driven shaft is rotated with the driving shaft. When it is desired to release the clutch, the clutch lever is operated to move clutch release sleeve 20 towards the left (Fig. 1), against the action of the spring 2. This will cause a release of the pressure exerted by the levers 14 upon the cam ring and thereby a release of the driving connection between the shafts 1 and 4. In order to make this release a positive one, there are provided a plurality of springs 33 carried by the cam ring 11 and each yieldingly engaging the head of a pin 34, set in the flange 3 of the fly-wheel. The heads of these pins engage in slots in the cam ring to guide the ring in its movement lengthwise of the shafts but to prevent rotative movement thereof. This means for insuring a positive release forms no part of my invention, it being disclosed and claimed in a co-pending application of George W. Borg, Serial #738,996 filed September 22, 1924.

The wear upon the friction rings 8 and 9 affects the levers 14, because of the fact that the ends 13 of these levers are in constant engagement with the cam ring. In the past it has been customary in this type of clutch to provide a ball and thrust or similar bearing between the parts corresponding to the clutch release sleeve and the clutch release collar. Therefore, as the wear on the rings 8 and 9 increased the cam ring 11 worked away from the ends of the levers 13. The result was lost motion between the cam ring 11 and the levers 14, together with all attendant disadvantages. This trouble I have overcome by making the bearing 28 of some suitable anti-friction bearing material such as a graphite composition and by proper selection of a material, I can insure that the wear on the friction rings 8 and 9 will be approximately compensated by the wear on the bearing 28. I have used for the bearing a graphite composition known commercially as U. S. graphite ring stock No. 2 and commercial standard woven asbestos facings.

In the past the levers corresponding to the levers 14 in this type of clutch have been made with an enlarged end in the form of a ball entering correspondingly shaped recesses in the clutch release sleeve. This arrangement has not insured constant contact between the levers and the sleeve and furthermore has required a thick lever. By employing levers having involute teeth at their ends, which ends engage in correspondingly shaped recesses in the sleeve, I provide a constant contact between the levers and the sleeve with all the advantages of constantly meshing gears. Furthermore, this construction makes possible the use of a lever which is much thinner, thereby cutting down the cost of manufacture and the space required therefor.

Referring now to Figs. 3 and 4 I have shown therein, a modified form of my invention in which a driving shaft 35, is provided with a fly-wheel 36 having a face 37 engaging a friction ring 38 carried by a friction disk 39 splined upon a driven shaft 40. The fly-wheel 36 is provided with the annular flange 41 which carries the cover plate 42 substantially similar to the cover plate 16. It is understood that in both embodiments the cover plate is rotatably adjusted to adjust for wear of the friction rings and also to vary the amount of force exerted by the spring. With the novel bearing which I employ in my invention, this adjustment is made unnecessary except for the purpose of varying the force to be exerted by the spring since the composition bearing tends to compensate for the wear of the facings.

In this embodiment the clutch release sleeve 43 is acted upon by the compression spring 44 to actuate the levers 45 in substantially the same manner as in the first described embodiment. However, in this embodiment I have shown anti-friction bearing 46 as carried by the collar 47 instead of by the sleeve 43.

In this embodiment the cam ring 48 is provided with a cam surface 49 formed in a series of steps, it being understood that this formation of surface may be employed to advantage also with the embodiment of Figs. 1 and 2. By this arrangement, as the plate 42 is rotated to vary the force exerted by the spring 44, the ends 50 of the levers 45 are at all times acting upon a surface at right angles to their direction of movement and therefore there is no tendency to a rotative movement between the levers and the cam ring, it being understood that the steps 49 are arranged with surfaces substantially parallel to the face 37 of the fly-wheel and therefore at right angles to the direction of movement of the levers. In this form also I provide the levers 45 with an involute tooth 51 upon the end of each lever engaging a correspondingly shaped recess 52 in the sleeve 43.

From the above it will be apparent that I have provided a novel and improved clutch in which the only part which contacts with the driven shaft is the friction disk which is splined thereto. All other parts, excepting of course the bearings for the shaft, are free from the shaft and therefore when the clutch is released, the momentum of the driven shaft is materially reduced. It will furthermore be apparent that I have provided an improved controlling means for the clutch which is constantly in mesh, is less expensive to manufacture, is lighter in weight, and occupies a smaller space. It will further be apparent that I have provided a clutch in which the wear of the composition bearing tends to compensate for the wear between the frictionally engaged surfaces, thereby avoiding the necessity of frequent adjustments. Furthermore, by placing the levers 14 at points approximately midway between the fastening means for the plate 16 on either side thereof, a certain amount of flexibility in the plate is permitted. By this means a sudden engagement of the clutch is prevented when the clutch lever is thrown in, because of the fact that the fulcrum 15 of each lever will give, away from the fly-wheel.

I am aware that changes in the form, construction and arrangement of parts may be made without departing from the spirit and without sacrificing the advantages of the invention and I reserve the right to make all such changes as fairly fall within the scope of the following claims:

I claim:

1. In a clutch, a driving shaft, a driven shaft, a fly-wheel carried by said driving shaft, a friction disk splined on said driven shaft and adapted to engage a face of said fly-wheel, a ring acting on the opposite side of said disk, a plate supported by said fly-wheel and having a central opening surrounding said driven shaft, a sleeve keyed to said plate and slidable in said opening, a plurality of levers mounted upon said plate and co-operating with said ring and said sleeve, said levers each having an involute tooth and the sleeve having correspondingly shaped recesses, a spring supported by said plate and acting on said sleeve to urge said levers into engagement with said ring to make said friction disk operative, a clutch release collar surrounding said shaft, and a bearing between said sleeve and said collar, said bearing being of anti-friction material adapted to wear and compensate for wear of the friction disks, said bearing being supported clear of the driven shaft.

2. In a clutch, a driving shaft, a driven shaft, a fly-wheel carried by said driving shaft, a friction disk splined on said driven shaft, a cam ring adapted to hold said friction disk in engagement with said fly-wheel, a plate carried by said fly-wheel and having a central opening surrounding said driven shaft, a sleeve slidably mounted in said opening and having a plurality of recesses therein, a spring carried by said plate and acting on said sleeve to urge it axially of said driven shaft, a plurality of levers mounted on said plate, each having one end contacted with said cam ring and the other end formed as an involute tooth engaging a recess in said sleeve, means for rotatably adjusting said plate on said fly-wheel, a collar surrounding said shaft, and a bearing between said collar and said sleeve, both said collar and said bearing being supported free of said shaft.

3. In a clutch, a driving shaft, a driven shaft, a fly-wheel carried by said driving shaft, a friction disk splined on said driven shaft, a cam ring adapted to hold said friction disk in engagement with said fly-wheel, a plate carried by said fly-wheel and having a central opening surrounding said driven shaft, a sleeve slidably mounted in said opening and having a plurality of recesses therein, a spring carried by said plate and acting on said sleeve to urge it axially of said driven shaft, a plurality of levers mounted on said plate, each having one end contacted with said cam ring and the other end engaging a recess in said sleeve, means for rotatably adjusting said plate on said fly-wheel, a collar surrounding said shaft, and a bearing between said collar and said sleeve, both said collar and said bearing being supported free of said shaft, said bearing being of wear resisting composition anti-friction material which will tend to compensate for the wear between said fly-wheel and said friction disk.

4. In a clutch, a driving shaft, a driven shaft, a fly-wheel on said driving shaft, a friction disk splined to said driven shaft, a cam ring holding said friction disk against said fly-wheel, said cam ring having a cam surface formed in steps, a plurality of levers, each having an end adapted to engage one of said steps, the steps of said cam surface being substantially parallel with the friction face of the fly-wheel and disposed at right angles to the direction of movement of the levers and means for actuating said levers.

5. In a clutch, a driving shaft, a driven shaft, a fly wheel carried by the driving shaft, a friction disk rigid on the driven shaft, friction rings on the disk, means for clamping said disk at the friction rings against the fly wheel, and means for operating said clamping means comprising a slidable sleeve, a release device, and a bearing interposed between the sleeve and release device, said bearing being made of wear resisting anti-friction lubricating composition material which will tend to compensate in wear approximately for the wear of the friction rings.

DAVID E. GAMBLE.